United States Patent [19]

Bourland

[11] 4,361,508
[45] Nov. 30, 1982

[54] CABLE FILLER COMPOSITIONS COMPRISING A MIXTURE OF (A) STYRENE BLOCK COPOLYMER, (B) CRYSTALLINE POLYPROPYLENE COPOLYMER AND (C) MINERAL OIL

[75] Inventor: Larry G. Bourland, Murrysville, Pa.

[73] Assignee: Arco Polymers, Inc., Philadelphia, Pa.

[21] Appl. No.: 198,405

[22] Filed: Oct. 20, 1980

[51] Int. Cl.$^3$ .............................................. C08K 5/01
[52] U.S. Cl. ............................... 523/173; 174/23 R; 174/23 C; 524/505; 525/95
[58] Field of Search ............... 260/33.6 AQ, 33.6 PQ, 260/33.6 VA; 525/95; 174/23 R, 23 C

[56] References Cited

U.S. PATENT DOCUMENTS

| | | | |
|---|---|---|---|
| 3,478,128 | 11/1969 | Hagemeyer et al. | 525/95 |
| 3,830,953 | 8/1974 | Wood et al. | 260/33.2 R |
| 3,865,776 | 2/1975 | Gergen | 260/33.6 AQ |
| 3,879,575 | 4/1975 | Dobbins et al. | 260/33.6 VA |
| 4,032,492 | 7/1977 | Englund et al. | 260/28.5 A |
| 4,076,659 | 2/1978 | Harper | 260/33.6 AQ |
| 4,105,619 | 8/1978 | Kaufman et al. | 260/33.6 PQ |
| 4,132,698 | 1/1979 | Gessler et al. | 260/33.6 AQ |
| 4,136,699 | 1/1979 | Collins et al. | 260/33.6 AQ |
| 4,176,240 | 11/1979 | Sabia | 260/33.6 AQ |
| 4,198,983 | 4/1980 | Becker et al. | 525/95 |
| 4,220,579 | 9/1980 | Rinehart | 260/33.6 AQ |

FOREIGN PATENT DOCUMENTS

| | | |
|---|---|---|
| 1307 | 4/1979 | European Pat. Off. . |
| 1532350 | 11/1978 | United Kingdom . |
| 2001657 | 2/1979 | United Kingdom . |

OTHER PUBLICATIONS

Chem, Abst. vol. 74 #22 (127177n) Legge et al. (Shell) Ger. Off. 2,034,725 "Elastomeric . . . Copolymer Blends".

*Primary Examiner*—Herbert J. Lilling
*Attorney, Agent, or Firm*—Dennis M. Kozak

[57] ABSTRACT

A cable filler composition comprises a mixture of mineral oil, a styrene-ethylene butylene-stryene block copolymer, and about 2–6 percent by weight of a thermoplastic polymer comprising an isotactic, crystalline polypropylene copolymer containing 0.1–4% by weight of an olefinic comonomer, the copolymer having a molecular weight of between 20,000 and 40,000.

5 Claims, No Drawings

CABLE FILLER COMPOSITIONS COMPRISING A MIXTURE OF (A) STYRENE BLOCK COPOLYMER, (B) CRYSTALLINE POLYPROPYLENE COPOLYMER AND (C) MINERAL OIL

BACKGROUND OF THE INVENTION

The use of mineral oil compositions containing a polyethylene polymer of specific properties in the formation of cable filler compositions and as splice compositions has been described, for example in U.S. Pat. No. 4,176,240 and U.S. Pat. No. 3,879,575. As described in U.S. Pat. No. 4,176,240, the contents of which are incorporated by reference herein, compositions for use as filling material can be prepared by admixing mineral oil, a styrene-ethylene butylene-styrene block copolymer, and a polyethylene which has a softening point of between 110°–130° C. Such compositions have been found to have improved handling characteristics over petroleum jelly-polyethylene cable filling materials.

As described in my copending application, Cable Filler Composition Containing Polypropylene, filed on even date herewith, a cable filling composition formed by admixing mineral oil, a styrene-ethylene butylene-styrene block copolymer, and an isotactic, crystalline polypropylene polymer having an average molecular weight of between 20,000 and 40,000, provides a composition having superior properties as compared with prior art compositions.

I have now found that the use of particular isotactic, crystalline polypropylene copolymers, with a minor amount of olefinic monomers, in cable filling compositions provides a composition having exceptional properties, as compared with prior art polyethylene containing compositions, and also as compound with polypropylene-containing compositions.

SUMMARY OF THE INVENTION

A cable filler composition for use in waterproofing electrical cables is formed by mixing a styrene-ethylene butylene-styrene block copolymer, a mineral oil, and about 2–6 percent by weight of a thermoplastic polymer comprising an isotactic, crystalline polypropylene copolymer containing 0.1–4% by weight of an olefinic comonomer, the copolymer having a molecular weight of between 20,000 and 40,000.

The cable filler composition of the present invention has a higher drop melting point than known compositions and provides a softer composition having a reduced elastic modulus to enable more ready processing and workability in the filling of electrical cables.

DETAILED DESCRIPTION

The cable composition of the present invention has improved properties of higher drop melting point and are softer and more workable than such prior compositions.

The present cable filler compositions comprise a mixture of mineral oil, a styrene-ethylene butylene-styrene block copolymer, and a low molecular weight isotactic, crystalline polypropylene copolymer, containing 0.1–4% by weight of an olefinic comonomer, of the general formula:

$$CH_2=CCR'$$

wherein R is a member selected from the group consisting of hydrogen and aromatic and aliphatic hydrocarbon groups containing 2–20 carbon atoms, and R' is a member selected from the group consisting of hydrogen and methyl. The copolymers for use in the present composition have a molecular weight of between 20,000 and 40,000 and are isotactic, crystalline polymeric materials that may be formed by degradation of higher molecular weight such polypropylene copolymers. These copolymers, having a low molecular weight, have a melting point of about 145° and are soft materials, readily processed, even when compared to polypropylene homopolymer of comparable molecular weights.

The present composition should contain mineral oil in an amount of between 87–91 percent by weight, and between about 5–7 percent by weight of the styrene-ethylene butylene-styrene block copolymer.

The amount of isotactic, crystalline, polypropylene copolymer, having an average of between 20,000 to 40,000, to be added to the mixture is between about 2–6 percent by weight.

As is known with prior art cable compositions containing thermoplastic polymers, various stabilizers or compatibilizers, such as antioxidants, or the like may be added to the composition.

EXAMPLE I

As an example of the composition of the present invention, a cable filling composition (Composition A) was prepared by mixing 88.5 percent mineral oil (Drakeol 35), 5.9 percent of a styrene-ethylene butylene-styrene block copolymer (Kraton 1652G, Shell Chemical Co.) 0.8% Krotinex 100, 0.2% Irganox 1035, and 4.6 percent by weight of a low molecular weight isotactic, crystalline copolymer of polypropylene containing 2.8 percent by weight of ethylene, the copolymer having an average molecular weight of 40,000. This composition was compared with a conventional composition (Control) which contained the same components except that 4.6 percent of a conventional low molecular weight polyethylene wax (AC-9); Allied Chemical Corp.), was substituted for the polypropylene copolymer. The properties of those two compositions are compared in Table I:

TABLE I

| Composition | Dissolution Temp (°C.) | Drop Melting Point (°C.) | Cloud Point (°C.) | Redissolution Temp. (°C.) |
|---|---|---|---|---|
| Control | 156 | 92 | 92 | 108 |
| A | 159 | 119.9 | 92 | 128 |

As indicated, the drop melting point of the present composition is raised significantly which indicates that the composition will better resist flow at elevated temperatures experienced in service operation, while the composition maintains a comparable cloud point temperature.

The above two compositions were also compared as to elastic modulus to determine the relative softness of the two compositions. Elastic modulus was determined using a Rheometrics mechanical spectrometer at a frequency of 1 radian per second at a temperature of 40° C. The elastic modulus of Composition A was $3.4 \times 10^4$ dynes/cm$^2$, while that of the control was $1.3 \times 19^5$ dynes/cm$^2$. A relative difference was also noted at a range of frequency from 0.1 to 100 radians/sec for the two compositions. The decrease in elastic modulus of Composition A shows the same to be a softer, and thus more processable, composition than the known composition.

EXAMPLE II

A series of compositions were formed containing the percent by weight of rubber "R" (Kraton G, a styrene-ethylene butylene-styrene block copolymer), and percent by weight of thermoplastic polymer "P"; wherein A=an isotactic, crystalline copolymer of polypropylene containing 2.8% ethylene comonomer and having an average molecular weight of 40,000; Control=a low molecular weight polyethylene wax (AC-9); as indicated in the following table; 0.8% Krotinex 100; 0.2% Irganox 1035; and the remainder mineral oil. The Brookfield viscosities of the composition at 130° C. are compared in Table II:

TABLE II

| Thermoplastic Polymer | Brookfield Viscosities at 130° C. (cps) | | |
|---|---|---|---|
| | Percent Polymer (P) and Rubber (R) | | |
| (P) | 4.6% P + 5.9% R | 4.7% P + 4.9% R | 3% P + 6% R |
| A | 50.8 | 48.7 | 42.5 |
| Control | 35.5 | 27.3 | 33.9 |

The results indicate that the composition of the present invention has a viscosity sufficiently comparable to the polyethylene wax so as to provide a workable composition.

The drop melting point (°C.) of these compositions were also determined and are listed in Table III:

TABLE III

| Thermoplastic Polymer | Drop Melting Points (°C.) | | |
|---|---|---|---|
| | Percent Polymer (P) and Rubber (R) | | |
| (P) | 4.6% P + 5.9% R | 4.7% P + 4.9% R | 3% P + 6% R |
| A | 119 | 119 | 117.5 |
| Control | 91 | 92 | 91.5 |

Results similar to those obtained with Sample A were obtained with polypropylene copolymers containing 2.8% ethylene and a molecular weight of 31,300 and with a polypropylene copolymer containing 3.5% ethylene and a molecular weight of 32,200.

I claim:

1. In a cable filling composition for use in waterproofing electrical cables wherein a thermoplastic polymer is admixed with a styrene-ethylene butylene-styrene block copolymer and mineral oil in an amount of 87-91 percent by weight of said composition, the improvement wherein said thermoplastic polymer comprises an isotactic, crystalline polypropylene copolymer containing 0.1-4% by weight of an olefinic comonomer, said copolymer having an average molecular weight of between 20,000 and 40,000.

2. In a cable filling composition for use in waterproofing electrical cables as defined in claim 1, the improvement wherein said styrene-ethylene butylene-styrene block copolymer is present in an amount of 5-7 percent by weight of said compositions.

3. In a cable filling composition for use in waterproofing electrical cables as defined in claim 1, the improvement wherein said isotactic, crystalline polypropylene copolymer is present in an amount of 2-6 percent by weight of said compositions.

4. In a cable filling composition for use in waterproofing electrical cables as defined in claim 1, the improvement wherein said comonomer is of the general formula:

$$CH_2=CRR'$$

wherein R is a member selected from the group consisting of hydrogen and aromatic and aliphatic hydrogen groups containing 2-20 carbon atoms, and R' is a member selected from the group consisting of hydrogen and methyl.

5. In a cable filling composition for use in waterproofing electrical cables as defined in claim 1, the improvement wherein said olefinic comonomer is ethylene.

* * * * *